United States Patent
Veliz et al.

(10) Patent No.: US 9,644,504 B2
(45) Date of Patent: May 9, 2017

(54) SINGLE CRYSTAL ENGINE VALVE

(71) Applicant: Caterpillar Inc., Peoria, IL (US)

(72) Inventors: Mark Veliz, Metamora, IL (US); Mark Geissler, Morton, IL (US)

(73) Assignee: Caterpillar Inc., Peoria, IL (US)

( * ) Notice: Subject to any disclaimer, the term of this patent is extended or adjusted under 35 U.S.C. 154(b) by 171 days.

(21) Appl. No.: 14/660,018

(22) Filed: Mar. 17, 2015

(65) Prior Publication Data

US 2016/0273418 A1    Sep. 22, 2016

(51) Int. Cl.

| | |
|---|---|
| *F01L 3/02* | (2006.01) |
| *F01L 3/00* | (2006.01) |
| *F01L 3/20* | (2006.01) |
| *B23K 11/16* | (2006.01) |
| *B23K 20/12* | (2006.01) |
| *B23K 20/22* | (2006.01) |
| *C22C 19/05* | (2006.01) |

(Continued)

(52) U.S. Cl.
CPC ............... *F01L 3/02* (2013.01); *B23K 11/16* (2013.01); *B23K 20/129* (2013.01); *B23K 20/22* (2013.01); *C22C 19/057* (2013.01); *F01L 3/00* (2013.01); *F01L 3/20* (2013.01); *B23K 2203/04* (2013.01); *B23K 2203/08* (2013.01); *B23K 2203/18* (2013.01); *F01L 2101/00* (2013.01)

(58) Field of Classification Search
CPC ....... F01L 3/02; F01L 3/00; F01L 3/20; F01L 2101/00; B23K 20/22; B23K 20/129; B23K 11/16; B23K 2203/08; B23K 2203/28; B23K 2203/04; C22C 19/057

USPC ............................................. 123/188.3, 193.5
See application file for complete search history.

(56) References Cited

U.S. PATENT DOCUMENTS

| | | | | |
|---|---|---|---|---|
| 4,073,474 A | * | 2/1978 | Hashimoto | .......... B23K 20/129 |
| | | | | 123/188.3 |
| 5,173,339 A | * | 12/1992 | Singer | ................... B23P 15/002 |
| | | | | 29/890.129 |

(Continued)

FOREIGN PATENT DOCUMENTS

| | | |
|---|---|---|
| DE | 3935496 C1 | 7/1990 |
| DE | 102006036101 A1 | 8/2007 |

(Continued)

OTHER PUBLICATIONS

Carosi et al., "Manufacturing of an Exhaust Valve for Internal Combustion Engine with Increased Performances," SAE Technical Paper 1994-25-0266, 1994, pp. 175-182.

(Continued)

*Primary Examiner* — Marguerite McMahon
(74) *Attorney, Agent, or Firm* — Baker Hostetler Bookoff McAndrews

(57) ABSTRACT

A valve for use in an internal combustion engine is disclosed. The valve includes a stem friction welded to a head portion. The head portion is cast from a single crystal metal using a casting process that creates little or no grain boundaries. The single crystal metal can be a nickel based superalloys such as CMSX-4, CMSX 3, Rene N5, and Rene N6. By having little or no grain boundaries, defects that occur in other types of casting material, such as large numbers of grain boundaries can be minimized. This allows the head portion and particularly the combustion face to withstand an operating temperature in the combustion chamber in excess of 850° C.

21 Claims, 3 Drawing Sheets

(51) Int. Cl.
  *B23K 103/04*  (2006.01)
  *B23K 103/08*  (2006.01)
  *B23K 103/18*  (2006.01)

(56) References Cited

U.S. PATENT DOCUMENTS

| | | | |
|---|---|---|---|
| 5,328,527 A * | 7/1994 | Kurup | C22C 38/06 |
| | | | 148/318 |
| 6,200,688 B1 | 3/2001 | Liang et al. | |
| 6,443,115 B1 | 9/2002 | Hoeg | |
| 8,632,890 B2 | 1/2014 | Hazel et al. | |
| 8,689,761 B2 | 4/2014 | Tanaka et al. | |
| 2004/0261746 A1 * | 12/2004 | Narasimhan | B23P 15/002 |
| | | | 123/188.3 |
| 2009/0282675 A1 | 11/2009 | Rozario | |
| 2012/0227688 A1 * | 9/2012 | Moon | F01L 1/2405 |
| | | | 123/90.1 |

FOREIGN PATENT DOCUMENTS

| | | |
|---|---|---|
| GB | 2110299 A | 6/1983 |
| JP | 56088908 A | 7/1981 |
| JP | 07042512 A | 2/1995 |
| WO | 2004079237 A2 | 9/2004 |
| WO | 2009127348 A1 | 10/2009 |
| WO | 2014093826 A2 | 6/2014 |

OTHER PUBLICATIONS

Pollock et al., "Nickel-Based Superalloys for Advanced Turbine Engines: Chemistry, Microstructure, and Properties," Journal of Propulsion and Power, vol. 22, No. 2, Mar.-Apr. 2006, pp. 361-374.

* cited by examiner

SINGLE CRYSTAL ENGINE VALVE

TECHNICAL FIELD

The disclosure relates to a heat resistant engine valve, and more specifically, a heat resistant engine valve of a reciprocating engine made from a single crystal metal casting process.

BACKGROUND

Intake valves of engines are positioned in an intake port disposed between the air intake and a combustion chamber. During an air intake stroke, a cam or rocker arm pushes the intake valve open and allows a fuel mixture to enter the combustion chamber. Further, exhaust valves are positioned in an exhaust port disposed between the combustion chamber and an exhaust flow passage. During an exhaust stroke, the cam or rocker arm pushes the exhaust valve open and combustion gases are expelled from the combustion chamber.

However, as engine power density increases and new combustion strategies are explored, engine exhaust valve operating temperatures requirements are increasing. These increasing temperatures are driven by both emissions regulations and industry-wide trends toward higher fuel efficiency and power density. The traditional limit has been about 725° C. operating temperature of continued exposure, with possible excursions up to 800° C. for a short period time. Standard valves are made of wrought iron-based austenitic stainless steel alloys, such as 23-8N (having a nominal composition of 23% Cr, 8% Ni, 2.5% Mn, 0.53 C, 0.43 N, balance Fe) or 21-4N (having a nominal composition of 21% Cr, 4% Ni, 9% Mn, 0.75% Si, 0.33 C, 0.30 N, balance Fe), however, these standard valves typically cannot operate above 750° C. for a sustainable period of time.

PCT Published Patent Application, WO/2004/079237 discloses a valve for an internal combustion engine, the method of its manufacturing and the heat-resisting titanium alloy containing the following relationship of components in mass %: aluminum 7,5-12,5, molybdenum 1,6-2,6, zirconium-1, 4-2,4, silicon-0,1-0,2, yttrium-0,05-0,1, titanium-the rest are offered. The claimed alloy has $\alpha+\alpha2+\beta$-phase content with $\alpha2$-phase based on the compound of Ti3Al dispersivily distributed in the $\alpha$-phase. The claimed method consists in producing the valve from a cylindrical fillet by the deformation treatment with the preliminary heating and subsequent heat-treatment. The preliminary heating of the stem is conducted up to the temperature 5-20° C. lower than the temperature of complete polymorphic transformation (Tpc) of the alloy. The deformation treatment of the stem is conducted by wedge-transverse rolling. The deformation of the head is conducted by forging with the preliminary heating up to the temperature 5-50° C. higher than Tpc of the alloy, which corresponds to the temperature of the beginning of forging. The ending of forging is conducted at the temperature lower than Tpc, forming the disc-shape valve head and the smooth transition of the stem and the head. The technical result of the invention is obtaining the valve, providing the operation of the valve in a range of operating temperatures. However, valves made from this process are not able to be operated at temperatures in excess of 850° C. for an extended period of time.

If the valve is operated above its rated temperature, then surface instability may occur and oxidation layers may form on the surface and eventually flake off and be introduced into the combustion chamber. Additionally, the high temperature can cause the valve to fatigue or cause microstructure changes or its properties to degrade in the alloy causing a failure of the valve during use.

Thus, there is a need for an improved process that provides an engine valve that can operate at high temperatures for a sustainable period of time.

SUMMARY

In one aspect, a valve for use in an internal combustion engine is disclosed. The valve may include a stem having a first end and a second end, a tip positioned at the first end of the stem; and a head portion having a filet and a combustion face, the head portion being friction welded to the second end of the stem, wherein the head portion is cast from a single crystal metal, has no grain boundary and withstands a temperature in excess of 850° C.

In another aspect, an internal combustion engine is disclosed. The engine includes a combustion chamber, at least one air intake leading into the combustion chamber and defining a port configured to receive a valve, wherein the valve includes a stem having a first end and a second end, a tip positioned at the first end of the stem; and a head portion having a filet and a combustion face, the head portion being friction welded to the second end of the stem, wherein the head portion is cast from a single crystal metal, has no grain boundary and withstands a temperature in excess of 850° C.

DETAILED DESCRIPTION

Figure 1:
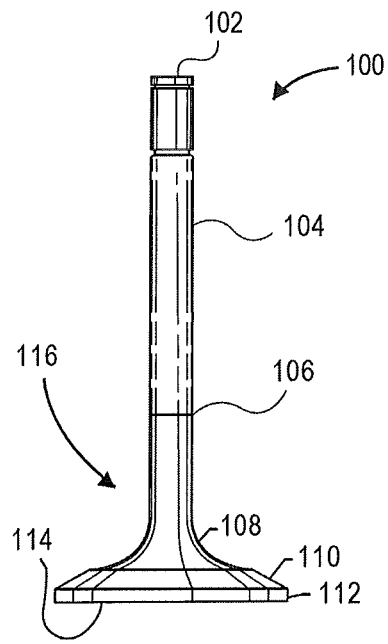
FIG. 1 illustrates a valve that may serve as an intake valve or an exhaust valve according to an aspect of the disclosure.

FIG. 1 illustrates a valve 100 that may serve as an intake valve or an exhaust valve according to an aspect of the disclosure. The valve 100 comprises of a stem 104 friction welded 106 to a head portion 116. The stem 104 may include a tip 102 at one end and ultimately connects to a fillet 108 at a second end. The fillet 108 serves to connect the stem 104 to a seat face 110. The seat face 110 may be disposed between the fillet 108 and a margin 112, which may be disposed between the seat face 110 and a combustion face 114. The head portion 116 may include the fillet 108, seat face 110, the margin 112, and the combustion face 114. During engine operation, there is a large temperature gradient that occurs in the valve 100 between the combustion face 114 and the tip 102. For example, during engine operation the combustion face 114 may experience a temperature of 850° C. or more from the combustion event while the tip 102 may experience a temperature of about 100° C. Thus, the head portion 116 including the combustion face 114 may be manufactured from a metal material that can withstand high temperatures at or above 850° C.

The stem may be made from polycrystalline wrought steel, such as carbon steel (1540 and 1541) and martensitic stainless steel (Silchrome 1). Since the stem is hit by a rocker arm during use, it should be made of a material that is also wear resistant even at lower temperatures. The tip 102 may include a button made from hardened steel attached by resistant weld or projection welding in order to protect stem from damage by the rocker arm during use. The tip may also include a fusion welded deposit of hardfacing material. The head portion 116 may be made of any material including a single grain of metal having little or no grain boundaries and will be further discussed below.

Figure 2:
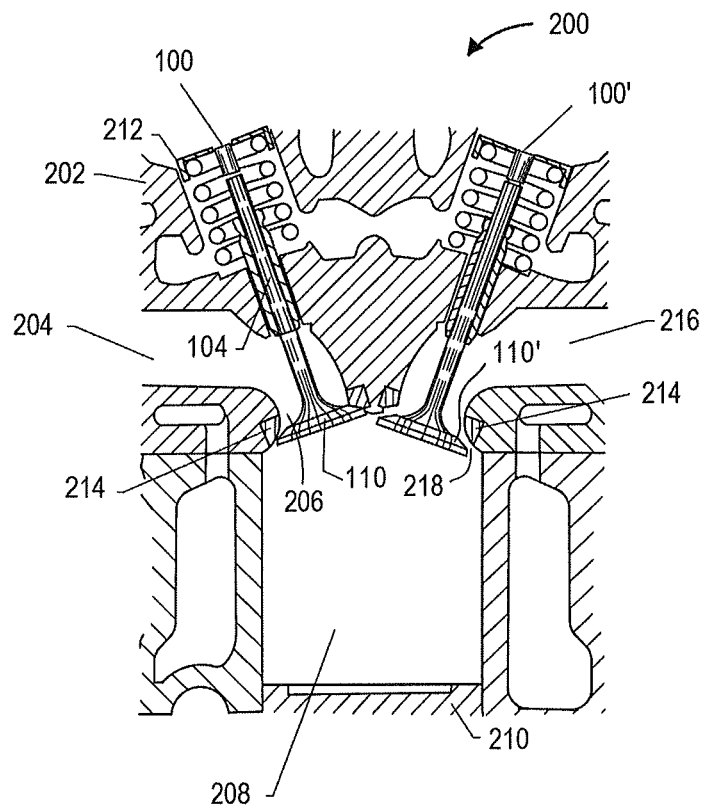
FIG. 2 illustrates the valve of FIG. 1 positioned within an engine of the vehicle according to an aspect of the disclosure.

FIG. 2 illustrates the valve 100 of FIG. 1 positioned within an engine 200 of the vehicle according to an aspect of the disclosure. The valve 100 may be an intake valve that can be installed in a cylinder head 202 that may define an air intake 204 that terminates at an intake port 206. The intake port 206 may lead to a combustion chamber 208, which may slidably accommodate a piston 210 (only partially shown in FIG. 2). The valve 100 may be biased into the closed position shown in FIG. 2 by a spring or other biasing element 212. The stem 104 may extend upward through said biasing element 212 to be engaged by an actuator in the form of a rocker arm or cam (not shown in FIG. 2). As shown in FIG. 2, the seat face 110 may engage a valve seat insert 214 in the closed position in order to seal the combustion chamber 208. The valve seat insert 214 is typically made part of the engine for wear resistance of that part of the engine. Also shown in FIG. 2 is another valve 100' or exhaust valve installed in the cylinder head 202 that also defines an exhaust passage 216 and an exhaust port 218. Another valve seat insert 214 is provided for seat face 110' so that in the closed position, the seat face 110' seals the combustion chamber 208.

According to an aspect of the disclosure, in order to withstand high temperatures at or above 850° C., the head portion 116 may be made from various materials including a single crystal metal such as nickel based superalloys. The nickel based superalloys may include CMSX-4 (having wt. percentages about 6.5% Cr, 9.0% Co, 0.6% Mo, 6.0% W, 6.5% Ta, 3% Re, 5.6% Al, 1.0% Ti, 0.10% Hf and the balance is nickel or other materials), CMSX 3 (having wt. percentages about 8.0% Cr, 5.0% Co, 0.6% Mo, 8.0% W, 6.0% Ta, 5.6% Al, 1.0% Ti, 0.10% Hf and the balance is nickel or other materials) from Cannon Muskegon Corporation or Rene N5 (having wt. percentages about 7.0% Cr, 7.5% Co, 1.5% Mo, 5.0% W, 6.5% Ta, 3% Re, 6.2% Al, 0.15% Hf and the balance is nickel or other materials), or Rene N6 (having wt. percentages about 4.2% Cr, 12.5% Co, 1.4% Mo, 6.0% W, 7.2% Ta, 5.4% Re, 5.8% Al, 0.15% Hf and the balance is nickel or other materials) from GE Aircraft Engines. CMSX-4 is a second generation rhenium-containing, nickel-base single crystal alloy capable of higher peak temperature/stress operation of at least 2125° F. (1163° C.). However, any single crystal metal that can withstand high heat such as 850° C. or more in an engine, without fatiguing or degrading, or be resistant to degradation in corrosive or oxidizing environments can be used according to an aspect of the disclosure. Further, the selected single crystal metal should be capable of being cast as a single crystal. In general, under high temperature for a long period of time, a grain structure tends to creep by grain boundary sliding leading to failure of the component. Thus, having a single crystal metal formed with no or minimal amount of grain boundary area creates a product highly resistant to creep deformation. Furthermore, the process used to cast the valve head as a single crystal requires very controlled melting and solidification practices. These operations result in reduced likelihood of defects, such as pores and inclusions, to be present in the finished casting, even as compared to traditional equiaxed investment castings. Defects such as pores and inclusions are known to be initiation sites for cracks, especially high cycle fatigue cracks. Therefore, a cast valve that is substantially free of pores and inclusions will exhibit greater long term durability in a reciprocating engine application.

Figure 3:
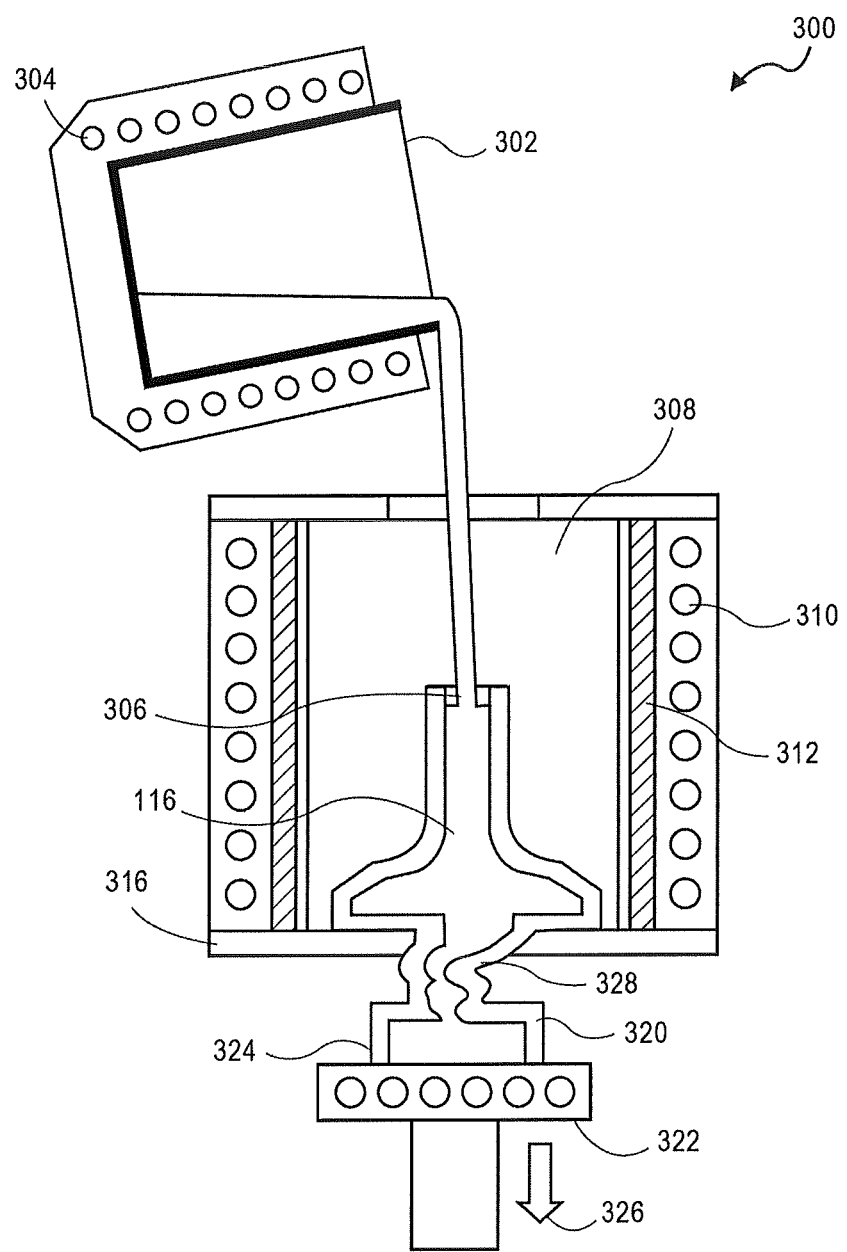
FIG. 3 illustrates an exemplary casting system according to an aspect of the disclosure.

There are many different processes that can be used to cast the head portion 116 such as the Bridgman method using a Bridgman furnace or the Czochralski method. FIG. 3 illustrates an casting system 300 according to an aspect of the disclosure. The Bridgman process is based on directional solidification by translating a molten melt from the temperature gradient formed in the casting system 300. A crucible 302 provides a single crystal metal 306. The single crystal metal 306 may be an ingot form before it is melted in a crucible 302 by induction coils 304. Induction coils 304 are configured within the inner wall of the crucible 302 and generates heat at a temperature at or higher than the melting point of the ingot. The single crystal metal 306 may be poured into a mold 308 having the shape of the head portion 116. The mold may be made from ceramic materials such as silica, alumina or zirconia. The mold 308 may be slowly formed by building up the ceramic layer using a wax pattern that is ultimately melted using a thermal cycle. The mold 308 is typically used once to make the head portion 116. The casting system 300 can also include induction coils 310 embedded in a wall of a furnace 316. Insulation 312 can also be provided within the furnace 316 to maintain the temperature therein. The pigtail 328 formed during the casting process attaches to a starter 320 that is located on a chill plate 324. The chill plate may be water cooled or coolant cooled according to an aspect of the disclosure. The chill plate 324 is attached to or positioned on a lift 322 that is moved in a direction of arrow 326.

In general, the furnace provides an area of temperature that is maintained above the melting temperature of the single crystal metal 306 through use of induction coils 310. The numerous induction coils 310 shown in FIG. 3 help to create a temperature gradient (highest) from the top of the furnace 316 to where the pigtail 328 (lowest) starts to form. The single crystal metal 306 in the form of an ingot is placed in a crucible 302 that is heated by induction coils 304 to a temperature above the melting point of the single crystal metal 306. The melted single crystal metal 306 is poured into the mold 308 that has been heated to the temperature above the melting point of the single crystal metal 306 by induction coils 310. As noted above, the lower portion of the furnace 316 is lower in temperature (below the melting point of the single crystal metal 306) then the top portion of the furnace, and thus solidification starts to occur at the lower portion of the furnace. Chill plate 324 also provides the lower temperature so that solidification occurs at a starter 320. As the chill plate 324 is slowly moved by lift 322 in direction of arrow 326 (or lower) and as the thermal gradient is controlled by the induction coils 310, the single crystal metal 306 is forced to grow vertically. The pigtail can filter out grain growth until only a single grain emerges to grow throughout the remainder of the mold 308. Once casted, the head portion 116 can be subjected to heat treatment cycles and machining in order to achieve the desired end product.

Figure 4:
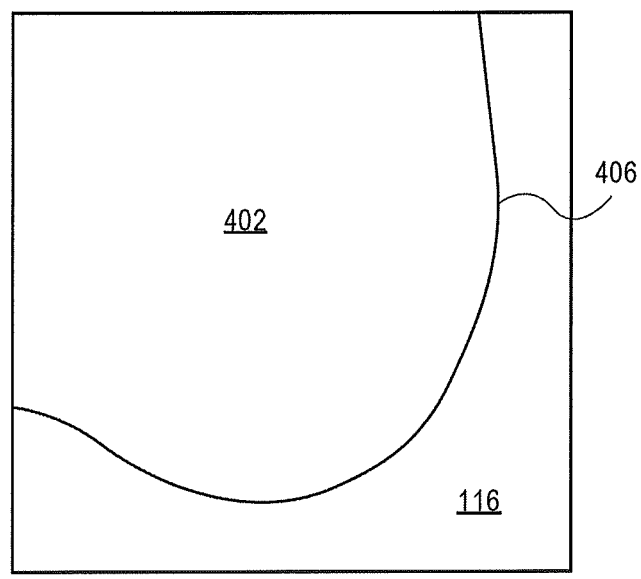
FIG. 4 illustrates a single grain growing with a grain boundary according to an aspect of the disclosure.

FIG. 4 illustrates a single grain 402 growing with a grain boundary 406 according to an aspect of the disclosure. As the single grain 402 grows according to the process described in FIG. 3, a grain boundary will proceed in front as the single grain grows. However, the completed casting of the head portion 116 contains no grain boundary or minimal amount of grain boundaries. With little or no grain boundaries, defects that can occur in other types of castings, such as large numbers of grain boundaries can be minimized. This allows the head portion 116 and particularly the combustion face 114, to withstand an operating temperature in the combustion chamber 208 in excess of 850° C.

As noted above, the stem 104 can be formed from polycrystalline wrought steel and the tip 102 can include a protection weld or resistant weld. The stem 104 can be friction welded 106 with the head portion 116 made of the process described herein in order to form the valve 100. In an aspect of the invention, the stem 104 can also be formed using process described herein in order for the stem 104 to withstand high temperature during combustion. Thus, the entire valve 100 can be cast in one piece using the single crystal metal 306.

INDUSTRIAL APPLICABILITY

Improved valves for internal combustion engines are provided. Intake valves and exhaust valves subjected to temperatures above 850° C. in a combustion chamber of an engine can fail due to fatigue or cracks, and thereby causing down time of the engine in order to replace and realign the valves. The improved valves are made at least partially (the head portion) from a single crystal metal 306 using a casting process that creates no grain boundaries or minimal amount of grain boundaries. The single crystal metal 306 can be a nickel based superalloys that may include CMSX-4 or CMSX 3 from Cannon Muskegon Corporation or Rene N5 and Rene N6 from GE Aircraft Engines. With little or no grain boundaries, defects that can occur in other types of castings, such as large numbers of grain boundaries can be minimized. This allows the head portion 116 and particularly the combustion face 114, to withstand an operating temperature in the combustion chamber 208 in excess of 850° C.

We claim:

1. An engine valve for use in an internal combustion engine, the engine valve comprising:
a stem having a first end and a second end;
a tip positioned at the first end of the stem; and
a head portion having a filet and a combustion face, the head portion being attached to the second end of the stem, wherein the head portion is cast from a single crystal metal, the single crystal metal having weight percentages of one of (a) 6.5% Cr, 9.0% Co, 0.6% Mo, 6.0% W, 6.5% Ta, 3% Re, 5.6% Al, 1.0% Ti, 0.10% Hf and the balance is nickel or other materials, (b) 8.0% Cr, 5.0% Co, 0.6% Mo, 8.0% W, 6.0% Ta, 5.6% Al, 1.0% Ti, 0.10% Hf and the balance is nickel or other materials, (c) 7.0% Cr, 7.5% Co, 1.5% Mo, 5.0% W, 6.5% Ta, 3% Re, 6.2% Al, 0.15% Hf and the balance is nickel or other materials, or (d) 4.2% Cr, 12.5% Co, 1.4% Mo, 6.0% W, 7.2% Ta, 5.4% Re, 5.8% Al, 0.15% Hf and the balance is nickel or other materials.

2. The valve of claim 1, wherein the tip includes a wear resistance material.

3. The valve of claim 2, wherein the wear resistant material is formed by hardened steel.

4. The valve of claim 2, wherein the wear resistant material is attached to the stem by welding.

5. The valve of claim 1, wherein the stem is made from a polycrystalline wrought steel.

6. The valve of claim 1, wherein the stem is also cast using the single crystal metal and having no grain boundary.

7. An internal combustion engine, comprising:
a combustion chamber;
at least one air intake leading into the combustion chamber and defining a port configured to receive a valve, wherein the valve comprises:
a stem having a first end and a second end;
a tip positioned at the first end of the stem; and
a head portion having a filet and a combustion face, the head portion being attached to the second end of the stem, wherein the head portion is cast from a single crystal metal having a composition in weight percentage between 4.2 to 8% Cr, 5 to 12.5% Co, 0.6 to 1.5% Mo, 5 to 8% W, 6 to 7.5% Ta, 3 to 5.4% Re, 5.6 to 6.2% Al, 0 to 1.0% Ti, 0.10 to 0.15% Hf and the balance is nickel or other materials.

8. The engine of claim 7, wherein the tip includes a wear resistance material.

9. The engine of claim 8, wherein the wear resistant material is formed by hardened steel.

10. The engine of claim 8, wherein the wear resistant material is attached to the stem by welding.

11. The engine of claim 7, wherein the stem is made from a polycrystalline wrought steel.

12. The engine of claim 7, wherein the stem is also cast using the single crystal metal.

13. The engine of claim 7, wherein the single crystal metal having weight percentages of about 6.5% Cr, 9.0% Co, 0.6% Mo, 6.0% W, 6.5% Ta, 3% Re, 5.6% Al, 1.0% Ti, 0.10% Hf and the balance is nickel or other materials.

14. The engine of claim 7, wherein the single crystal metal having weight percentages of about 8.0% Cr, 5.0% Co, 0.6% Mo, 8.0% W, 6.0% Ta, 5.6% Al, 1.0% Ti, 0.10% Hf and the balance is nickel or other materials.

15. The engine of claim 7, wherein the single crystal metal having weight percentages of about 7.0% Cr, 7.5% Co, 1.5% Mo, 5.0% W, 6.5% Ta, 3% Re, 6.2% Al, 0.15% Hf and the balance is nickel or other materials.

16. The valve of claim 7, wherein the single crystal metal having weight percentages of about 4.2% Cr, 12.5% Co, 1.4% Mo, 6.0% W, 7.2% Ta, 5.4% Re, 5.8% Al, 0.15% Hf and the balance is nickel or other materials.

17. An engine valve for use in an internal combustion engine, the engine valve comprising:
a stem having a first end and a second end;
a tip positioned at the first end of the stem; and
a head portion having a filet and a combustion face, the head portion being attached to the second end of the stem, wherein the head portion is cast from a single crystal metal, the single crystal metal being one of CMSX-4, CMSX-3, Rene N5, or Rene N6.

18. The engine valve of claim 17, wherein the single crystal metal includes a composition in weight percentage of about 6.5% Cr, 9.0% Co, 0.6% Mo, 6.0% W, 6.5% Ta, 3% Re, 5.6% Al, 1.0% Ti, 0.10% Hf, and the balance is nickel or other materials.

19. The engine valve of claim 17, wherein the single crystal metal includes a composition in weight percentage of about 8.0% Cr, 5.0% Co, 0.6% Mo, 8.0% W, 6.0% Ta, 5.6% Al, 1.0% Ti, 0.10% Hf and the balance is nickel or other materials.

20. The engine valve of claim 17, wherein the single crystal metal includes a composition in weight percentage of about 7.0% Cr, 7.5% Co, 1.5% Mo, 5.0% W, 6.5% Ta, 3% Re, 6.2% Al, 0.15% Hf and the balance is nickel or other materials.

21. The engine valve of claim 17, wherein the single crystal metal includes a composition in weight percentage of about 4.2% Cr, 12.5% Co, 1.4% Mo, 6.0% W, 7.2% Ta, 5.4% Re, 5.8% Al, 0.15% Hf and the balance is nickel or other materials.

* * * * *